(12) United States Patent
Führer et al.

(10) Patent No.: US 10,823,254 B2
(45) Date of Patent: Nov. 3, 2020

(54) TORSIONAL VIBRATION DAMPING SYSTEM FOR A MOTOR VEHICLE DRIVE TRAIN, HYBRID DRIVE MODULE, AND MOTOR VEHICLE DRIVE TRAIN

(71) Applicant: ZF Friedrichshafen AG, Friedrichshafen (DE)

(72) Inventors: Kim Führer, Lindau (DE); Matthias Cudok, Ritschenhausen (DE); Thomas Riedisser, Sigmarszell (DE); Thorsten Müller, Friedrichshafen (DE); Stephan Stroph, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 54 days.

(21) Appl. No.: 16/313,981

(22) PCT Filed: May 16, 2017

(86) PCT No.: PCT/EP2017/061727
§ 371 (c)(1),
(2) Date: Dec. 28, 2018

(87) PCT Pub. No.: WO2018/001620
PCT Pub. Date: Jan. 4, 2018

(65) Prior Publication Data
US 2019/0195312 A1 Jun. 27, 2019

(30) Foreign Application Priority Data
Jun. 30, 2016 (DE) .......................... 10 2016 211 943

(51) Int. Cl.
*B60K 6/48* (2007.10)
*F16F 15/123* (2006.01)
(Continued)

(52) U.S. Cl.
CPC .......... *F16F 15/12353* (2013.01); *B60K 6/40* (2013.01); *B60K 6/48* (2013.01);
(Continued)

(58) Field of Classification Search
CPC ........... F16F 15/12353; F16F 15/13469; F16F 15/145; B60K 6/40; B60K 6/48; B60K 2006/4825; B60Y 2400/48
See application file for complete search history.

(56) References Cited

U.S. PATENT DOCUMENTS 9,046,161 B2   6/2015  Takikawa et al.
9,834,082 B2  12/2017  Dögel et al.
(Continued)

FOREIGN PATENT DOCUMENTS

DE  102010030690 A1   1/2012
DE  112011102382 T5   4/2013
(Continued)

OTHER PUBLICATIONS

German Search Report DE102016211943.5 dated Jan. 11, 2017. (9 pages).
(Continued)

*Primary Examiner* — David J Hlavka
(74) *Attorney, Agent, or Firm* — Dority & Manning, P.A.

(57) ABSTRACT

A torsional vibration damping system (7) for a motor vehicle drive train (1) has an input side (14) and an output side (26) connected via a damper unit (27). The damper unit (27) includes two torsional vibration dampers (17, 18) and a vibration damper (19). The damper unit (27) are configured for placement in a wet space (30) of a housing (6).

21 Claims, 2 Drawing Sheets

(51) Int. Cl.
*B60K 6/40* (2007.10)
*F16F 15/14* (2006.01)
*F16F 15/134* (2006.01)

(52) U.S. Cl.
CPC ...... *F16F 15/13469* (2013.01); *F16F 15/145* (2013.01); *B60K 2006/4825* (2013.01); *B60Y 2400/48* (2013.01); *Y02T 10/62* (2013.01)

(56) References Cited

U.S. PATENT DOCUMENTS

| | | | |
|---|---|---|---|
| 9,890,816 B2* | 2/2018 | Steinberger | F16D 3/12 |
| 10,030,740 B2* | 7/2018 | Tomiyama | F16H 45/02 |
| 2008/0023287 A1* | 1/2008 | Thiede | B60K 6/48 |
| | | | 192/48.1 |
| 2010/0242466 A1* | 9/2010 | Krause | F16F 15/167 |
| | | | 60/327 |
| 2015/0090555 A1 | 4/2015 | Miyahara et al. | |
| 2015/0122605 A1 | 5/2015 | Grossgebauer et al. | |
| 2017/0045113 A1 | 2/2017 | Ito et al. | |

FOREIGN PATENT DOCUMENTS

| | | |
|---|---|---|
| DE | 102012205797 A1 | 10/2013 |
| DE | 102012219728 A1 | 4/2014 |
| DE | 112012006376 T5 | 1/2015 |
| EP | 2853773 A1 | 4/2015 |
| JP | 2015222118 A | 12/2015 |

OTHER PUBLICATIONS

International Search Report (English Translation) PCT/EP2017/061727, dated Jul. 26, 2017. (4 pages).

* cited by examiner

TORSIONAL VIBRATION DAMPING SYSTEM FOR A MOTOR VEHICLE DRIVE TRAIN, HYBRID DRIVE MODULE, AND MOTOR VEHICLE DRIVE TRAIN

FIELD OF THE INVENTION

The invention relates generally to a torsional vibration damping system for a motor vehicle drive train, having an input side and an output side which are connected via a damper unit including at least one torsional vibration damper and a vibration damper, wherein the damper unit and the vibration damper are designed for placement in a wet space of a housing.

Moreover, the invention relates generally to a hybrid drive module including a housing, in which a torsional vibration damping system and an electric machine are accommodated, wherein the torsional vibration damping system including a damper unit and a vibration damper which are provided between an input side and an output side of the torsional vibration damping system and are placed in a wet space of the housing, wherein the torsional vibration damping system is connected at its output side to a separating clutch, via which the torsional vibration damping system is connectable to an output side of the hybrid drive module, to which the electric machine is also connected. Finally, the invention relates generally to a motor vehicle transmission and to a motor vehicle drive train including an aforementioned hybrid drive module.

BACKGROUND

A motor vehicle drive train, as a spring-mass system, forms an oscillatory system, in which rotational irregularities can occur. If the motor vehicle drive train includes a drive machine in the form of an internal combustion engine, these rotational irregularities or torsional vibrations are already introduced into the system via the drive machine, since, due to the operating method of the internal combustion engine, periodically acting torsional forces are superposed with the actual turning motion of the crankshaft of the internal combustion engine. Since torsional vibrations significantly diminish the ride comfort and can also result in a high component load up to damage to the component, measures are usually taken in a motor vehicle drive train for damping and, therefore, reducing torsional vibrations.

For this purpose, a torsional vibration damping system is frequently provided between the internal combustion engine and a motor vehicle transmission, in which torsional vibrations in the relevant frequency range are damped in a targeted manner with the aid of at least one torsional vibration damper. A torsional vibration damper, which can be, for example, a dual-mass flywheel, is designed for the appropriate frequency range for this purpose. Moreover, a torsional vibration damping system frequently also includes a vibration damper, with the aid of which a targeted mistuning of the oscillatory system with the aid of a rotational-speed-dependent deflection of additional masses and, therefore, a reduction of torsional vibrations are also achieved.

Increasingly, an above-described torsional vibration damping system is also part of a hybrid drive module, in which an electric machine is additionally provided in order to implement certain driving functions. This electric machine is usually situated on an output side of the hybrid drive module, wherein the output side can be connected to an input side of the hybrid drive module via the intermediate torsional vibration damping system by engaging a separating clutch. Therefore, the output side is seperable from the input side by disengaging the separating clutch and, therefore, an operation of the electric machine can also be implemented without a mechanical connection to the internal combustion engine. In this way, purely electric driving or even a recuperation of electrical energy during the braking operation (recuperation) can be achieved, whereas driving functions such as an operation of the electric machine as a generator, boosting via the electric machine, a start-stop function, etc., can be implemented with the separating clutch engaged.

DE 10 2012 219 728 A1 describes a hybrid drive module for a motor vehicle drive train, wherein, in this hybrid drive module, a torsional vibration damping system and an electric machine are accommodated in a housing. The torsional vibration damping system includes a damper unit with a torsional vibration damper and a vibration damper, which are provided between an input side and an output side of the torsional vibration damping system and are placed in a wet space of the housing. In addition, the torsional vibration damper operates according to the power-distribution principle, in that the input side and the output side are further coupled to one another via a differential drive. Moreover, the output side of the torsional vibration damping system is connected to a separating clutch, via which the torsional vibration damping system can be connected to an output side of the hybrid drive module. A rotor of the electric machine is then also connected to this output side.

SUMMARY OF THE INVENTION

Proceeding from the above-described prior art, example aspects of the present invention provide a torsional vibration damping system, with the aid of which a suitable damping of torsional vibrations is to be achievable.

According to example aspects of the invention, a torsional vibration damping system has an input side and an output side which are connected via a damper unit including at least one torsional vibration damper and a vibration damper. In this case, the damper unit and the vibration damper are designed for placement in a wet space of a housing.

The torsional vibration damping system therefore includes a damper unit which includes at least one torsional vibration damper. A torsional vibration damper within the meaning of the invention is a system, in which a primary side and a secondary side are torsionally elastically coupled to one another via at least one intermediate element, whereby a vibration isolation is achieved. The at least one intermediate element is preferably a spring element in the form of a spiral spring. In that respect, the torsional vibration damper is preferably configured as a dual-mass flywheel. If necessary, a hydraulic damping can also be provided, however.

The vibration damper is preferably formed by multiple masses which are deflected in a rotational-speed-dependent manner and, in this way, mistune the oscillatory system in a targeted manner. It is particularly preferred when, for this purpose, the masses are hinged at one end in order to be able to be deflected radially toward the outside and influence the rotational speed.

Within the meaning of the invention, a "wet space" of a housing is understood to be a delimited space of the particular housing, in which lubricant, preferably in the form of oil, is accommodated and in which the components located therein can come into contact with the lubricant. In particular, the wet space of the housing is filled with lubricant up to a defined extent in this case in order to lubricate, via immersion, components accommodated in the housing.

The wording that the damper unit and the vibration damper are designed for placement in a wet space means, in this case, that the damper unit and the vibration damper are adapted, with respect to their lubrication, to be placed in a wet space of a housing. Thus, the damper unit and the vibration damper are supplied with oil, in particular, from radially inwardly, and, thereafter, the oil is easily discharged radially toward the outside. As compared to an arrangement of the damper unit and the vibration damper in a dry space, a lubricant supply of these components can therefore be implemented without the need to prevent the lubricant from escaping radially toward the outside.

Example aspects of the invention now encompass the technical teaching that the damper unit includes two torsional vibration dampers. In other words, the damper unit therefore includes two torsional vibration dampers which, together with the vibration damper, are situated between the input side and the output side of the torsional vibration damping system.

Such a configuration of a torsional vibration damping system has the advantage in this case that a better damping of torsional vibrations in the motor vehicle drive train can be achieved by providing two torsional vibration dampers. This is the case because the arrangement of two torsional vibration dampers makes it possible to reduce the torsional rigidity of the damper unit. Overall, in the case of a torsional vibration damping system configured according to example aspects of the invention, a reliable damping of torsional vibrations can be achieved while simultaneously reliably lubricating components of the system.

In DE 10 2012 219 728 A1, although the damper unit and the vibration damper are also configured for placement in a wet space of a housing, the damper unit is formed by only one torsional vibration damper in this case.

According to example aspects of the invention, the input side and the output side of the torsional vibration damping system are coupled to one another only via the intermediate damper unit and the vibration damper. It is also conceivable within the scope of the invention, however, to implement a power-split configuration in this case, in that a differential drive is associated with the torsional vibration damping system, as is also disclosed in DE 10 2012 219 728 A1, for example. Thus, a differential drive could include one or even several planetary gear stages.

According to one embodiment of the invention, the torsional vibration dampers of the damper unit are connected in series. The torsional vibration dampers are therefore arranged in succession, in the direction of power flow, from the input side to the output side. In one refinement of this embodiment, the vibration damper is then integrated between the torsional vibration dampers, wherein, alternatively, the vibration damper could also be located on the input side or on the output side of the two torsional vibration dampers.

According to one further design option of the invention, the torsional vibration dampers are arranged in a common plane. The vibration damper is provided, in this case, axially directly next to the torsional vibration dampers and radially at the level of the radially internal torsional vibration damper. Due to the arrangement of the torsional vibration dampers in a plane, a particularly compact axial configuration of the torsional vibration damping system can be implemented.

In the combination of the aforementioned design option of the invention and a series connection of the torsional vibration dampers, the torsional vibration dampers are combined to form one double-row, dual-mass flywheel. In this case, the two torsional vibration dampers therefore form one unit, wherein, alternatively, the two torsional vibration dampers can also be present separately from one another as independent components. In the latter case, the torsional vibration dampers can then have the same configuration or different configurations.

According to one further design option of the invention, the damper unit and/or the vibration damper are radially enclosed, at least in a vertically lower area, by a stationary shell. In other words, a stationary shell is therefore provided, which lies vertically lower than the damper unit and/or the vibration damper and, there, radially encloses the damper unit or the vibration damper or both. Advantageously, the shell prevents the damper unit and the vibration damper from plunging vertically downward too deeply in lubricant and prevents increased churning losses and a churning of the oil from occurring. This is the case because, due to the shell, an area having a lower lubricant level can be created in the area of the damper unit and the vibration damper than in the surrounding area of the wet space. It is particularly preferred when the shell is utilized when the torsional vibration dampers are arranged in a plane. In addition, the shell preferably surrounds the damper unit and the vibration damper.

According to one further embodiment of the invention, a hollow shaft is provided on the input side of the torsional vibration damping system, into which one further shaft is inserted and is rotationally fixed thereto. Via the further shaft, a connection to the damper unit and the vibration damper is established, wherein a sealing plate is mounted on the hollow shaft, which is utilized for separating the wet space from a dry space of the housing. In one refinement of this embodiment, the hollow shaft and the further shaft are connected to one another via a driving toothing which is implemented as an interference fit. With the aid of the interference fit, the situation is prevented in which shifting can occur in the driving toothing and, therefore, a noise generation in the area of the torsional vibration damping system can occur in the course of load changes in the drive train, especially since torsional vibrations in the area of the driving toothing have not yet been damped.

It is further preferred that the hollow shaft, the further shaft, the damper unit, the vibration damper, and the sealing plate form a preassembled unit. This has the advantage that, despite the driving toothing which is implemented as an interference fit, the sealing plate can be arranged, including a seal, on the hollow shaft. Moreover, the formation of a preassembled unit reduces the complexity of assembly, since, in the course of assembly, this unit merely needs to be arranged in the motor vehicle drive train.

A torsional vibration damping system according to example aspects of the invention is, in particular, part of a hybrid drive module for a motor vehicle drive train. This hybrid drive module includes a housing in this case, in which the torsional vibration damping system and an electric machine are accommodated. The torsional vibration damping system includes, in this case, according to the invention, a damper unit and a vibration damper which are provided between an input side and an output side of the torsional vibration damping system and are placed in a wet space of the housing. Moreover, the torsional vibration damping system is connected, on its output side, to a separating clutch, via which the torsional vibration damping system is connectable to an output side of the hybrid drive module, to which the electric machine is also connected. According to example aspects of the invention, the damper unit then includes two torsional vibration dampers.

By providing a torsional vibration damping system configured according to example aspects of the invention including two torsional vibration dampers, a suitable damping of torsional vibrations can also be achieved in the area of a hybrid drive module. In addition, various functions can be implemented with the aid of the electric machine of the hybrid drive module, in that the electric machine is operated as a generator or as an electric motor. In this way, the electric machine, when operated as an electric motor, can assist the drive machine by delivering an additional drive torque (boosting) or even achieve a purely electric driving operation. In addition, a start-stop function can be implemented via the electric machine, in that the electric machine starts the internal combustion engine as part of the starting process. When the electric machine is operated as a generator, current can be generated via the drive machine, during the operation, or current can even be recuperated in the course of the braking operation (recuperation). During the purely electric driving operation and also the recuperation, the connection to the drive machine is to be disconnected, in each case, by disengaging the separating clutch.

The electric machine may be designed, in particular, as a permanently excited synchronous machine. In addition, a rotor of the electric machine is preferably directly rotationally fixed to the output side of the hybrid drive module, wherein a rotor hub of the rotor can be mounted directly onto an input shaft of a motor vehicle transmission following in the motor vehicle drive train. As a result, a mounting of the rotor of the electric machine can be implemented via the mounting of the input shaft of the motor vehicle transmission. It is preferred when seats are provided between the rotor hub and the input shaft of the motor vehicle transmission in order to appropriately center the rotor of the electric machine on the input shaft.

A stator of the electric machine is attached, in particular, to the housing of the hybrid drive module, wherein a configuration is preferably selected in this case, in which a stator carrier is attached to an intermediate wall, preferably via bolted connections. This intermediate wall is then also utilized for accommodating a mounting of the transmission input shaft, and so the fixing of the stator and the mounting of the rotor take place on the same part of the housing. Moreover, the intermediate wall separates the wet space from an interior space of a downstream motor vehicle transmission. It is further preferred when the intermediate wall also takes over the function of the oil feed to certain components in this case and, for this purpose, is interspersed with appropriate oil lines.

Within the scope of the invention, a radial offset in the torsional vibration damping system, which is present, if necessary, is preferably compensated in the torsional vibration damper of the torsional vibration damping system located on the output side. This takes place, in particular, in a spring set of the torsional vibration damper. In this case, a "radial offset" is to be understood to be an unintentional radial position deviation—setting in, for example, due to manufacturing tolerances or running inaccuracies of components—between components to be connected to one another.

In one refinement of the invention, an axial offset in the hybrid drive module is compensated in the separating clutch, wherein the separating clutch is preferably configured as a multi-disk clutch for this purpose. The compensation of the axial offset then takes place, in particular, in a disk tooth system of the multi-disk clutch, via which disks are guided in a rotationally fixed and axially movable manner. According to the invention, an "axial offset" is to be understood to be an unintentional axial position deviation—setting in, for example, due to manufacturing tolerances—between components to be connected to one another. In this case, the axial offset can be imparted to the hybrid drive module within the motor vehicle drive train from the outside, in that components of the motor vehicle drive train, between which the hybrid drive module is situated, ensure that the axial offset is present. This position deviation is now compensated by the separating clutch. As a result, a thrust bearing between the torsional vibration damping system and the output side of the hybrid drive module can be omitted.

The torsional vibration damping system utilized in the hybrid drive module can also be designed according to one of the above-described variants. Moreover, the hybrid drive module is, in particular, part of a motor vehicle drive train and is then situated, in particular, between a drive machine and a downstream motor vehicle transmission. The hybrid drive module can also be an integral part of the motor vehicle transmission. For this purpose, the hybrid drive module and the motor vehicle transmission can be accommodated in a common housing which is, in particular, a transmission housing of the motor vehicle transmission.

The invention is not limited to the described combination of the other independent claims or claims dependent thereon. In addition, individual features can be combined with one another, provided they arise from the claims, the description of a preferred embodiment of the invention which follows, or directly from the drawings. References in the claims to the drawings via the use of reference characters is not intended to limit the scope of protection of the claims.

BRIEF DESCRIPTION OF THE DRAWINGS

One preferred embodiment of the invention, which is explained in the following, is represented in the drawings. Wherein.

DETAILED DESCRIPTION

Figure 1:
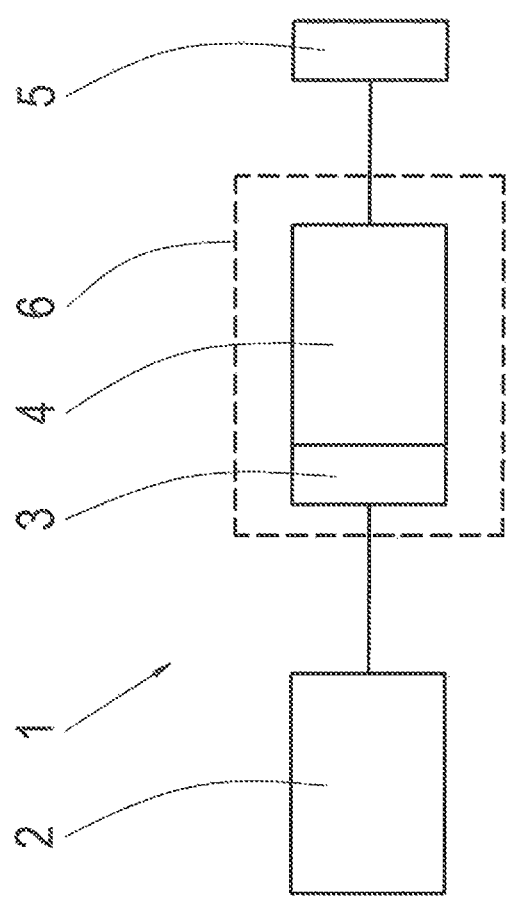
FIG. 1 shows a schematic view of a motor vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic view of a motor vehicle drive train 1 which is, in particular, the drive train of a motor vehicle in the form of a passenger car. The motor vehicle drive train 1 includes a drive machine 2 in the form of an internal combustion engine which is connectable, on the output side, to a motor vehicle transmission 4 via an intermediate hybrid drive module 3.

The motor vehicle transmission 4 is preferably configured as an automatic transmission of a planetary design in this case and is connected, on the output side, to further, downstream components 5—which are merely indicated in this case—of the motor vehicle drive train, for example, to an interaxle or interwheel differential. In this case, the hybrid drive module 3 and the motor vehicle transmission 4 are accommodated in a common housing 6 which is, in particular, a transmission housing of the motor vehicle transmission 4.

Figure 2:
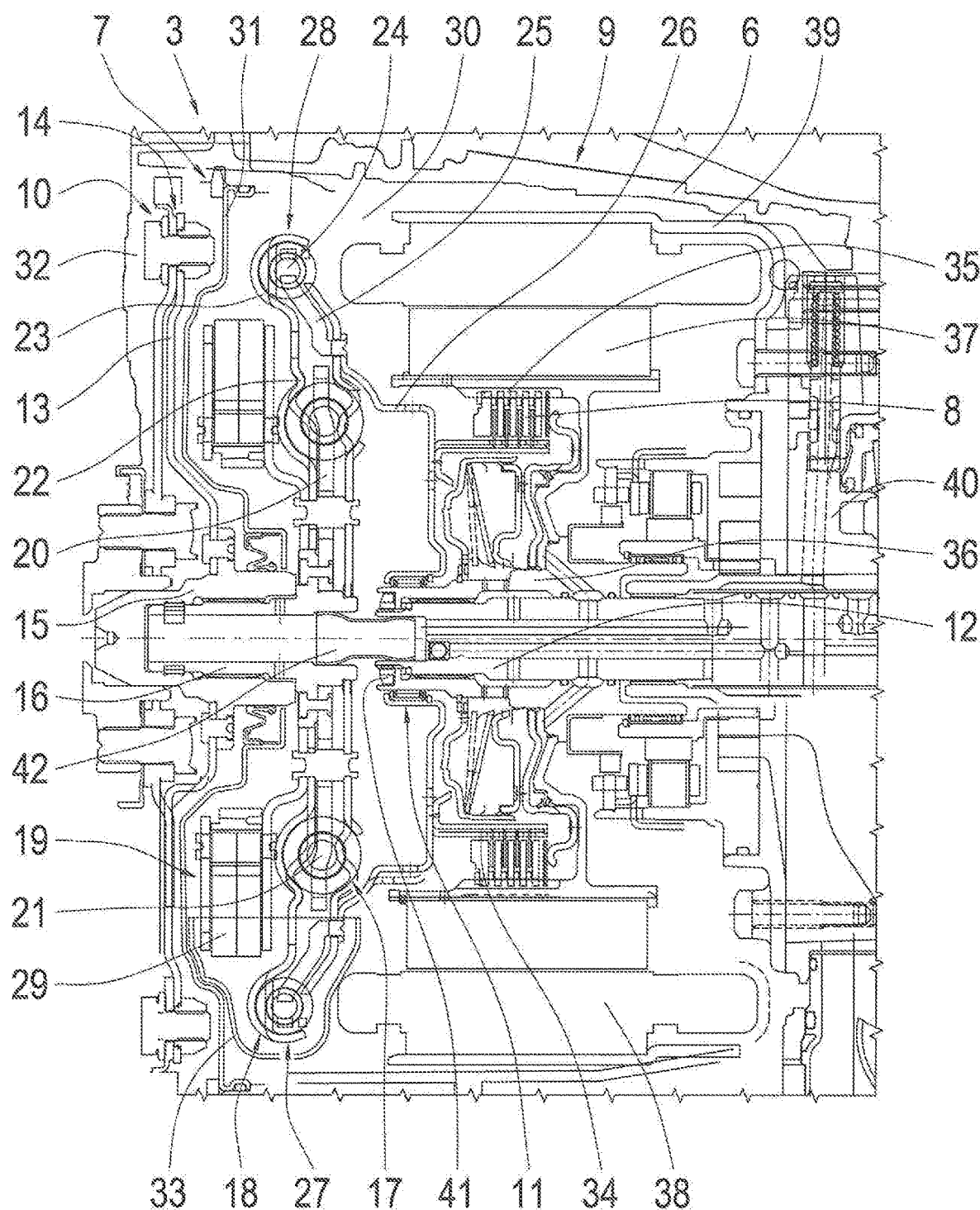
FIG. 2 shows a cutaway view of the motor vehicle drive train from FIG. 1, in the area of a hybrid drive module according to one preferred embodiment of the invention.

FIG. 2 shows a view of the motor vehicle drive train 1 from FIG. 1 cut in the area of the hybrid drive module 3, wherein the hybrid drive module 3 is configured according to one preferred embodiment of the invention. In this case, the hybrid drive module 3 is composed of a torsional vibration damping system 7, a separating clutch 8, and an electric machine 9. In addition, the hybrid drive module 3 is rotationally fixed to a crankshaft of the drive machine 2 on an input side 10 within the motor vehicle drive train 1, and is rotationally fixed to an input shaft 12 of the downstream motor vehicle transmission 4 on an output side 11. The input side 10 is formed, in this case, by a flexible connecting plate 13 which simultaneously also defines an input side 14 of the torsional vibration damping system 7 and is rotationally fixed to a hollow shaft 15.

As is also apparent in FIG. 2, the hollow shaft 15 is rotationally fixed to one further shaft 16 which, for this purpose, has been inserted into the hollow shaft 15 and establishes a connection to two torsional vibration dampers 17 and 18, and to a vibration damper 19. Specifically, a primary side 20 of the torsional vibration damper 17 is arranged on the shaft 16 in a rotationally fixed manner in this case, wherein the primary side 20 is torsionally elastically coupled, via a spring set 21 in the form of multiple compression springs and compression spring guide elements, to a secondary side 22 which simultaneously forms a primary side 23 of the downstream torsional vibration damper 18 and to which the vibration damper 19 is also rotationally fixed. The secondary side 22 of the torsional vibration damper 17 and, therefore, also the primary side 23 of the torsional vibration damper 18 is then also torsionally elastically coupled, in the direction of power flow, via a spring set 24 of the torsional vibration damper 18 to a secondary side 25 which also forms an output side 26 of the torsional vibration damping system 7. In this case, the spring set 24 of the torsional vibration damper 18 is also present in the form of multiple compression springs and compression spring guide elements.

In FIG. 2, it is apparent that the two torsional vibration dampers 17 and 18 essentially lie in a plane and, together, define a damper unit 27 of the torsional vibration damping system 7. Due to their configuration and their series connection, the two torsional vibration dampers 17 and 18 form a double-row, dual-mass flywheel 28 which is distinguished by a compact axial configuration and considerably reduced torsional rigidity.

The vibration damper 19 is integrated between the two torsional vibration dampers 17 and 18 and is configured as a rotational-speed-adaptive vibration damper. For this purpose, the vibration damper 19 includes multiple swing-mounted centrifugal weights 29 which are deflected in a rotational-speed-dependent manner and, in this way, bring about a reduction of torsional vibrations by way of a targeted mistuning of the oscillatory system.

The damper unit 27 in the form of the double-row, dual-mass flywheel 28 and the vibration damper 19 are both accommodated in a wet space 30 of the surrounding housing 6, in which lubricant in the form of oil is located. The wet space 30 is separated via a sealing plate 31 from a dry space 32, in which the flexible connecting plate is arranged and, therefore, the connection to the crankshaft of the drive machine 2 is also established. A lubrication of the damper unit 27 and also of the vibration damper 19 takes place from radially inwardly via feed bores which are not represented further in detail here. Thereafter, the oil is discharged radially toward the outside and collects in the vertically lower area of the wet space 30, from where it can be removed for lubrication once again.

Since the dual-mass flywheel 28 is radially relatively bulky and, consequently, would plunge the torsional vibration damper 18, in particular, into the oil bath of the wet space 30, the damper unit 27 and the vibration damper 19 are radially enclosed in the vertically lower area by a shell 33 which, there, shields the area of the vibration damper 19 and the damper unit 27 from the oil and, therefore, minimizes churning losses. This shell 33 is attached to the sealing plate 31 in this case.

The rotationally fixed connection between the hollow shaft 15 and the further shaft 16 is implemented via a driving toothing, wherein this driving toothing is configured as an interference fit in this case in order to prevent noise generation during load changes in the motor vehicle drive train. Due to this press-fit connection between the hollow shaft 15 and the further shaft 16, the sealing plate 31 is also to be arranged on the hollow shaft 15 including the appropriate seal before the two shafts are joined. Together with the damper unit 27 and the vibration damper 19, the hollow shaft 15, the further shaft 16, and the sealing plate 31 form a preassembled unit which is installed in the hybrid drive module 3.

On the output side 26, the torsional vibration damping system 7 is connected to the separating clutch 8, via which the output side 26 of the torsional vibration damping system 7 is connectable to the output side 11 of the hybrid drive module 3. The separating clutch 8 is configured as a multi-disk clutch in this case, the inner disk carrier 34 of which is rotationally fixed to the secondary side 25 of the torsional vibration damper 8 and the outer disk carrier 35 of which is formed on a rotor hub 36 of the electric machine 9. The rotor hub 36 guides a rotor 37 of the electric machine 9, which runs radially internally with respect to a stator 38 of the electric machine 9. The electric machine 9 is implemented as a permanently excited synchronous motor in this case, wherein the stator 38 is attached via a stator carrier 39 to an intermediate wall 40 which separates the hybrid drive module 3 from the motor vehicle transmission 4.

Via the electric machine 9, various functions such as the recuperation of electrical energy during the braking operation of the motor vehicle (recuperation), an operation as a generator, a start-stop function, boosting, and/or purely electric driving can be implemented. In this case, the purely electric driving and the recuperation are to be carried out with the separating clutch 8 disengaged and, therefore, the drive machine 2 disconnected, while operation as a generator, the start-stop function, and boosting via the electric machine 9 each take place with the separating clutch 8 engaged.

The rotor hub 36 has been mounted directly onto the input shaft 12 in this case and has been centered on the input shaft 12 via seats. A fixing takes place in this case via a grooved nut 41. Moreover, a radial offset present in the hybrid drive module 3 is compensated in the spring set 24 of the torsional vibration damper 18, while an axial offset within the separating clutch 8 is compensated via the disk tooth system of the inner disk carrier 34.

Finally, a pipe connection 42 is provided between the shaft 16 and the input shaft 12, which is configured to be spherical on both sides and is utilized for transferring lube oil between the input shaft 12 and the shaft 16. The pipe connection 42 allows for radial movements between the shaft 16 and, therefore, the torsional vibration damping system 7, and the input shaft 12. The lube oil guided into this area is then guided radially toward the outside in order to lubricate the vibration damper 19 and the dual-mass flywheel 28, wherein, thereafter, the oil can flow radially toward the outside.

With the aid of the configuration of a torsional vibration damping system according to example aspects of the invention and, therefore, a hybrid drive module, a suitable damping of torsional vibrations can be achieved.

Modifications and variations can be made to the embodiments illustrated or described herein without departing from the scope and spirit of the invention as set forth in the appended claims.

REFERENCE CHARACTERS 1 motor vehicle drive train
2 drive machine
3 hybrid drive module
4 motor vehicle transmission
5 components
6 housing
7 torsional vibration damping system
8 separating clutch
9 electric machine
10 input side
11 output side
12 input shaft
13 connecting plate
14 input side
15 hollow shaft
16 shaft
17 torsional vibration damper
18 torsional vibration damper
19 vibration damper
20 primary side
21 spring set
22 secondary side
23 primary side
24 spring set
25 secondary side
26 output side
27 damper unit
28 dual-mass flywheel
29 centrifugal weight
30 wet space
31 sealing plate
32 dry space
33 shell
34 inner disk carrier
35 outer disk carrier
36 rotor hub
37 rotor
38 stator
39 stator carrier
40 intermediate wall
41 grooved nut
42 pipe connection

The invention claimed is:

1. A torsional vibration damping system (7) for a motor vehicle drive train (1) having an input side (14) and an output side (26), the torsional vibration damping system (7) comprising:
a damper unit (27) connecting the input side (14) and the output side (26), the damper unit (27) comprising two torsional vibration dampers (17, 18) and a vibration damper (19), the damper unit (27) configured for placement in a wet space (30) of a housing (6);
a hollow shaft (15) provided on the input side (14);
a further shaft (16) inserted into and rotationally fixed to the hollow shaft (15), a connection to the damper unit (27) and the vibration damper (19) established via the further shaft (16); and
a sealing plate (31) mounted on the hollow shaft (15), the sealing plate (31) separating the wet space (30) from a dry space (32) of the housing (6).

2. The torsional vibration damping system (7) of claim 1, wherein the two torsional vibration dampers (17, 18) are connected in series.

3. The torsional vibration damping system (7) of claim 2, wherein the vibration damper (19) is integrated between the two torsional vibration dampers (17, 18).

4. The torsional vibration damping system (7) of claim 2, wherein the two torsional vibration dampers (17, 18) are combined to form one double-row, dual-mass flywheel (28).

5. The torsional vibration damping system (7) of claim 1, wherein the two torsional vibration dampers (17, 18) are arranged in a common axial plane, the vibration damper (19) is provided axially directly next to the two torsional vibration dampers (17, 18), and the vibration damper (19) is radially at the level of a radially internal torsional vibration damper (17) of the two torsional vibration dampers (17, 18).

6. The torsional vibration damping system (7) of claim 5, wherein the two torsional vibration dampers (17, 18) are combined to form one double-row, dual-mass flywheel (28).

7. The torsional vibration damping system (7) of claim 1, further comprising a stationary shell (33), wherein the damper unit (27) or the vibration damper (19) are radially enclosed, at least in a vertically lower area, by the stationary shell (33).

8. The torsional vibration damping system (7) of claim 1, wherein the hollow shaft (15) and the further shaft (16) are connected via a driving toothing with an interference fit.

9. The torsional vibration damping system (7) of claim 1, wherein the hollow shaft (15), the further shaft (16), the damper unit (27), the vibration damper (19), and the sealing plate (31) form a preassembled unit.

10. A hybrid drive module (3) for a motor vehicle drive train (1), comprising:
a torsional vibration damping system (7) comprising a damper unit (27) and a vibration damper (19) which are provided between an input side (14) and an output side (26) of the torsional vibration damping system (7);
an electric machine (9), the electric machine (9) connected to an output side (11) of the hybrid drive module (3);
a separating clutch (8), the torsional vibration damping system (7) connected at the output side (26) to the separating clutch (8), the torsional vibration damping system (7) connectable to the output side (11) of the hybrid drive module (3) via the separating clutch (8); and
a housing (6) in which the torsional vibration damping system (7) and the electric machine (9) are accommodated, the damper unit (27) and the vibration damper (19) placed in a wet space (30) of the housing (6),
wherein the damper unit (27) comprises two torsional vibration dampers (17, 18).

11. The hybrid drive module (3) of claim 10, wherein the two torsional vibration dampers (17, 18) are connected in series.

12. The hybrid drive module (3) of claim 11, wherein the vibration damper (19) is integrated between the two torsional vibration dampers (17, 18).

13. The hybrid drive module (3) of claim 11, wherein the two torsional vibration dampers (17, 18) are combined to form one double-row, dual-mass flywheel (28).

14. The hybrid drive module (3) of claim 10, wherein the two torsional vibration dampers (17, 18) are arranged in a common axial plane, the vibration damper (19) is provided axially directly next to the two torsional vibration dampers (17, 18), and the vibration damper (19) is radially at the level of a radially internal torsional vibration damper (17) of the two torsional vibration dampers (17, 18).

15. The hybrid drive module (3) of claim 14, wherein the two torsional vibration dampers (17, 18) are combined to form one double-row, dual-mass flywheel (28).

16. The hybrid drive module (3) of claim 10, further comprising a stationary shell (33), wherein the damper unit (27) or the vibration damper (19) are radially enclosed, at least in a vertically lower area, by the stationary shell (33).

17. The hybrid drive module (3) of claim 10, further comprising a hollow shaft (15), a further shaft (16) and a sealing plate (31), wherein:

the hollow shaft (15) is provided on the input side (14);
the further shaft (16) is inserted into and rotationally fixed to the hollow shaft (15);
a connection to the damper unit (27) and the vibration damper (19) is established via the further shaft (16); and
the sealing plate (31) is mounted on the hollow shaft (15), the sealing plate (31) separating the wet space (30) from a dry space (32) of the housing (6).

18. The hybrid drive module (3) of claim 17, wherein the hollow shaft (15) and the further shaft (16) are connected via a driving toothing with an interference fit.

19. The hybrid drive module (3) of claim 17, wherein the hollow shaft (15), the further shaft (16), the damper unit (27), the vibration damper (19), and the sealing plate (31) form a preassembled unit.

20. A motor vehicle transmission (4), comprising the hybrid drive module (3) of claim 10.

21. A motor vehicle drive train (1), comprising the hybrid drive module (3) of claim 10.

* * * * *